US012801204B2

(12) United States Patent
Gozzini et al.

(10) Patent No.: US 12,801,204 B2
(45) Date of Patent: Nov. 17, 2026

(54) ANALOG VOLTAGE SHIFTER ON POWER MANAGEMENT UNIT (PMU) SUPPLY

(71) Applicant: Apple Inc., Cupertino, CA (US)

(72) Inventors: Fabio Gozzini, San Jose, CA (US); Alberto Puggelli, Palo Alto, CA (US); Sanjay Pant, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 73 days.

(21) Appl. No.: 18/582,630

(22) Filed: Feb. 20, 2024

(65) Prior Publication Data

US 2025/0264931 A1 Aug. 21, 2025

(51) Int. Cl.

*G06F 1/3296* (2019.01)
*G06F 1/3228* (2019.01)
*G06F 1/3234* (2019.01)

(52) U.S. Cl.

CPC .......... *G06F 1/3296* (2013.01); *G06F 1/3228* (2013.01); *G06F 1/3243* (2013.01)

(58) Field of Classification Search

CPC ..... G06F 1/3296; G06F 1/3228; G06F 1/3243
See application file for complete search history.

(56) References Cited

U.S. PATENT DOCUMENTS

| | | | | |
|---|---|---|---|---|
| 11,054,878 | B2 | 7/2021 | Wang et al. | |
| 2006/0170658 | A1* | 8/2006 | Nakamura | G06F 3/0412 345/173 |
| 2016/0036443 | A1 | 2/2016 | Li et al. | |
| 2017/0047930 | A1 | 2/2017 | Chai et al. | |
| 2019/0327002 | A1 | 10/2019 | Foong et al. | |
| 2021/0041496 | A1* | 2/2021 | Srinivasan | G01R 31/2856 |
| 2022/0066490 | A1* | 3/2022 | Searles | H03K 17/223 |
| 2022/0300608 | A1 | 9/2022 | Srivastava et al. | |
| 2023/0344350 | A1 | 10/2023 | Greco et al. | |
| 2024/0154514 | A1* | 5/2024 | Butzen | G06F 1/28 |
| 2024/0154526 | A1* | 5/2024 | Chen | H02M 1/0009 |

* cited by examiner

*Primary Examiner* — Nimesh G Patel
(74) *Attorney, Agent, or Firm* — FLETCHER YODER PC

(57) ABSTRACT

Systems and methods described herein include an analog voltage shifter within an integrated circuit. The analog voltage shifter may adjust a voltage supplied by a power management unit (PMU) to a load without first instructing the PMU to make the adjustment. Fine-tuning power supplies based on the analog voltage shifter and PMU arrangements as described herein may improve integrated circuit operation by permitting relatively faster voltage adjustment operations, which may reduce a cumulative time spent oversupplying or undersupplying power to the load and thus improve power efficiency.

20 Claims, 7 Drawing Sheets

ANALOG VOLTAGE SHIFTER ON POWER MANAGEMENT UNIT (PMU) SUPPLY

BACKGROUND

This disclosure relates to systems and methods of power management circuitry of a semiconductor device and, more particularly, to adjusting a voltage supplied by the power management circuitry.

Integrated circuits are found in a vast array of electronics devices, including computers, handheld devices, wearable devices, vehicles, robotics, and more. An electronic device may be operated into various operational modes, such as a normal mode, a powered-off mode, and a reduced-power mode, among others. In some systems, circuit blocks designed to perform various functions may be designed to operate at different power supply levels. Power management circuitry may vary power supply levels delivered to the different circuit blocks.

Power management circuitry may include one or more power converter circuits that generate regulated voltage levels based on an input power supply signal. Such regulating circuits may employ different operations to regulate a respective voltage level. For example, a power converter may be buck converter, sometimes described as a step-down converter, or another suitable regulator. Yet operating these power circuits could result a voltage being delivered to an integrated circuit that is different from a desired supply voltage, such as can occur when a power consumed by the integrated circuit changes from a power consumption expected by the power management circuitry.

SUMMARY

Computer systems may include multiple circuits to perform specific operations. The circuits may be fabricated on one or more substrates and may use different power supply voltage levels. Power Management Units (PMUs) may include multiple power converter circuits that generate regulated voltage levels for various power supply signals delivered to one or more loads, such as one or more system-on-chips (SOCs). Such power converter circuits may be designed to keep a voltage constant in view of changes in input voltage or circuit load, such as when power consumed by an SOC varies. As part of this, the PMU may include or couple to power converters, like a buck converter, and rails, like a power rail.

A system-on-chip (SOC) may be powered by a power rail coupled to a power management unit (PMU). To change power supplied to the power rail, the SOC may digitally communicate with or send control data to the PMU (e.g., power feedback) via a communication bus. The PMU may adjust its operation based on this feedback from the SOC to increase or decrease an amount of power delivered via the power rail to the SOC by changing a voltage supplied. This process is effective but communicating the feedback via the communication bus takes time and adds undesirable amounts of latency to the control operations. Furthermore, some SOCs use the communication bus for other types of communications. Thus, sending PMU control communications via the communication bus may compete with a total bandwidth shared with the other types of communications, which can further increase delays or inefficiencies in timing of communications exchanges between the SOC and PMU.

Systems and methods described herein may implement SOC-side voltage adjustments via an analog voltage shifter on a logic power rail (e.g., power rail delivering voltage to SOC circuitry or the like) and inside the SOC. The analog voltage shifter may provide accurate and faster fine-tuning of voltages delivered via the power rail since the analog voltage shifter is controlled via control configurations applied within the SOC—a relatively faster way to program the configuration when compared to transmitting instructions via the communication bus. By including an analog voltage shifter in the SOC, power received from the power rail may be fine-tuned in relatively lower amounts of time than compared to adjustments implemented via communication bus methods. The analog voltage shifter enables SOC-side control of the voltage adjustment, bypassing the communication bus, which may reduce an overall time used and latency relative to the voltage adjustment being implemented on the PMU-side.

To elaborate, the analog voltage shifter may be inserted between a sense line and a PMU feedback bus. The analog voltage shifter may control a voltage suppled to SOC circuitry based on the programmed control bits and the voltage on the power rail. Based on this local adjustment applied, the analog voltage shifter may send feedback to the PMU that causes the PMU to make any global adjustment changes based on the local adjustment. The SOC may program the analog voltage shifter using a configuration (e.g., control bits) and a control bit register inside the SOC. This example and others are described herein.

BRIEF DESCRIPTION OF THE DRAWINGS

Various aspects of this disclosure may be better understood upon reading the following detailed description and upon reference to the drawings described below.

DETAILED DESCRIPTION

When introducing elements of various embodiments of the present disclosure, the articles “a,” “an,” and “the” are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
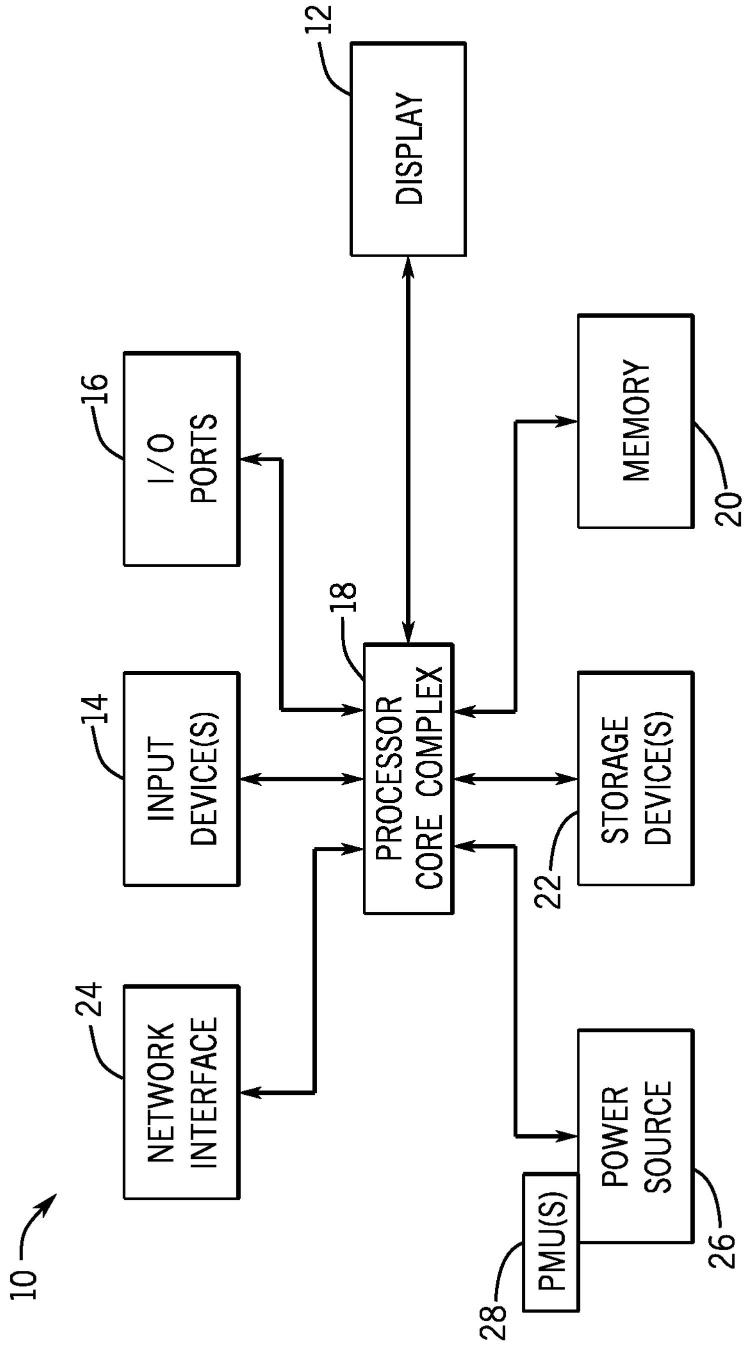
FIG. 1 is a schematic block diagram of an electronic device, in accordance with an embodiment.

This disclosure relates to an electronic device, such as an electronic device 10 of FIG. 1, that includes a power management unit (PMU). The electronic device may be any suitable electronic device, such as a computer, a mobile phone, a portable media device, a tablet, a television, a virtual-reality headset, a wearable device such as a watch, a vehicle and/or vehicle dashboard, or the like. FIG. 1 is intended to represent one example of a particular implementation and is intended to illustrate the types of components that may be present in the electronic device 10.

The electronic device 10 of FIG. 1 includes an electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and a power management unit (PMU) 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. One or more PMU(s) 28 may help distribute power to various circuitries of the electronic device 10. Although multiple PMUs 28 may be described herein, for ease of description, these multiple PMUs 28 may sometimes be referred to herein as the PMU 28. Some descriptions included herein may apply to systems with one PMU and/or to systems with multiple PMUs. Furthermore, PMUs 28 may include different components relative to each other, for example some PMUs 28 may include regulators while other PMUs 28 may not include regulators, as is described further herein.

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch-sensing components may receive user inputs by detecting occurrence or position of an object touching the surface of the electronic display 12.

Figure 2:
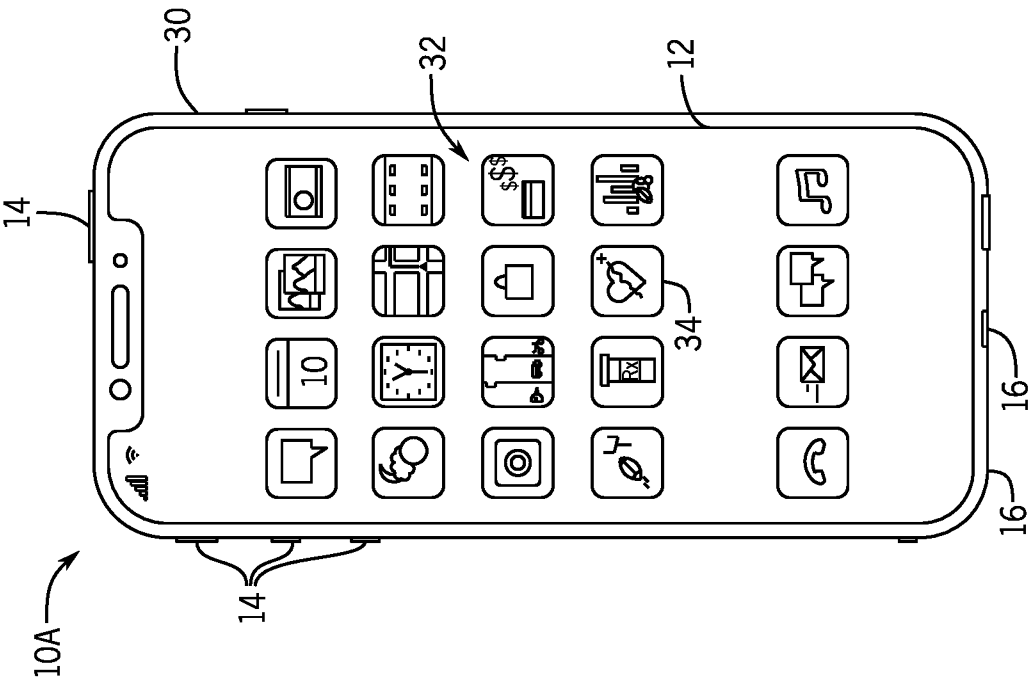
FIG. 2 is a front view of a mobile phone representing an example of the electronic device of FIG. 1, in accordance with an embodiment.

The electronic device 10 may take any suitable form. One example of the electronic device 10 in the form of a handheld device 10A is shown in FIG. 2. The handheld device 10A may be a portable phone, a media player, a personal data organizer, a handheld game platform, or the like. For illustrative purposes, the handheld device 10A may be a smartphone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
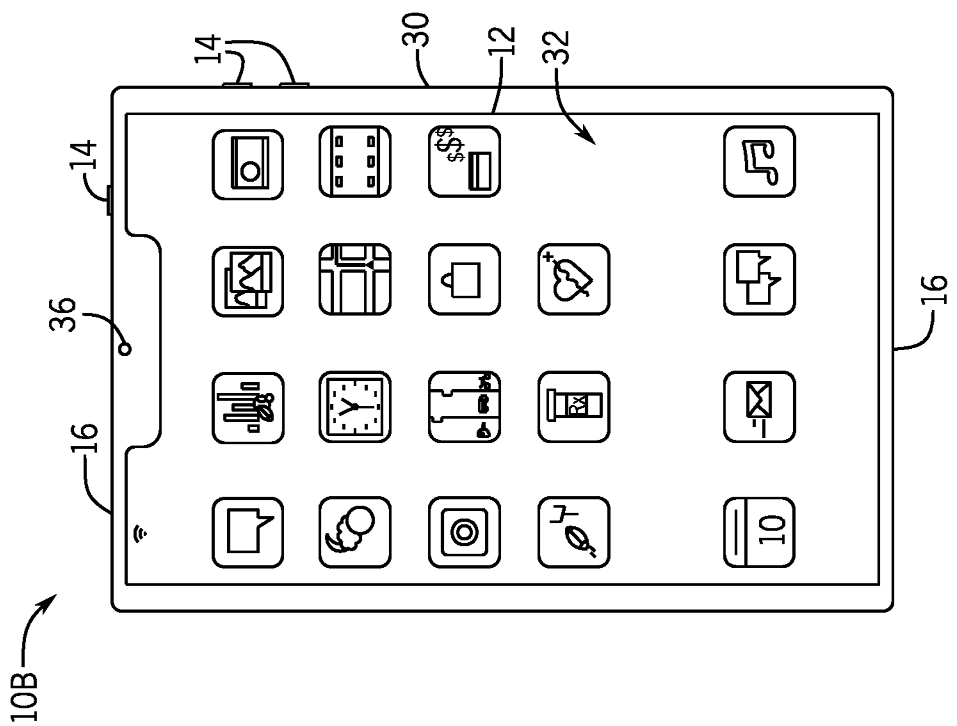
FIG. 3 is a front view of a tablet device representing an example of the electronic device of FIG. 1, in accordance with an embodiment.
Figure 4:
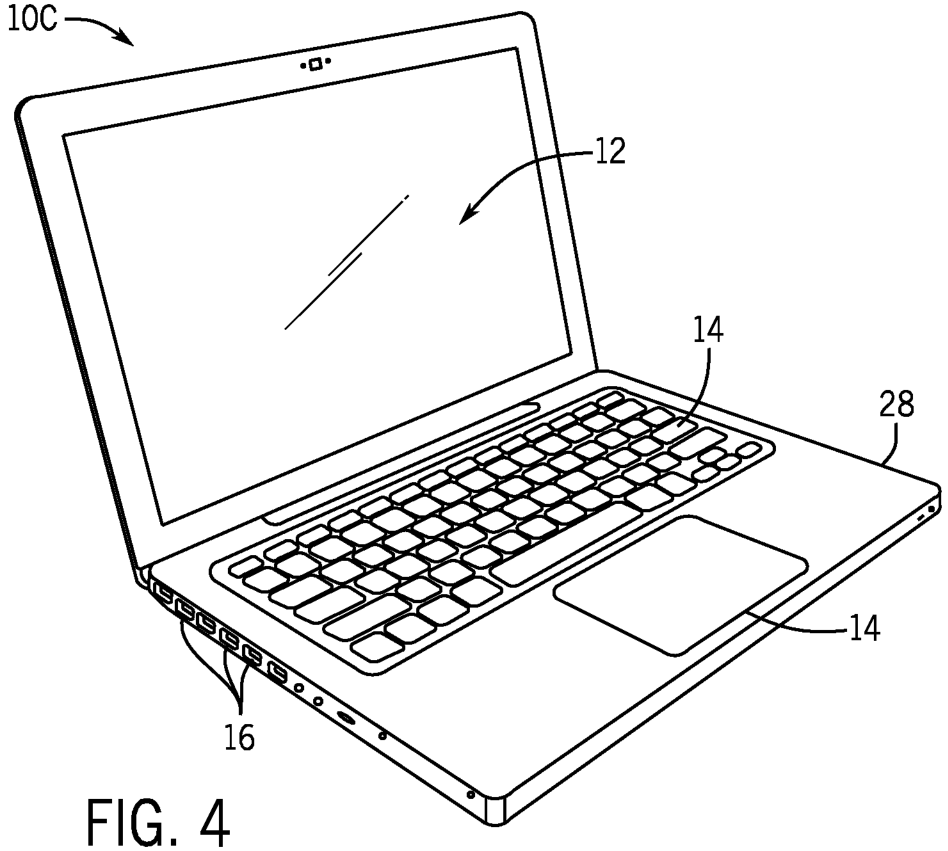
FIG. 4 is a front view of a notebook computer representing an example of the electronic device of FIG. 1, in accordance with an embodiment.
Figure 5:
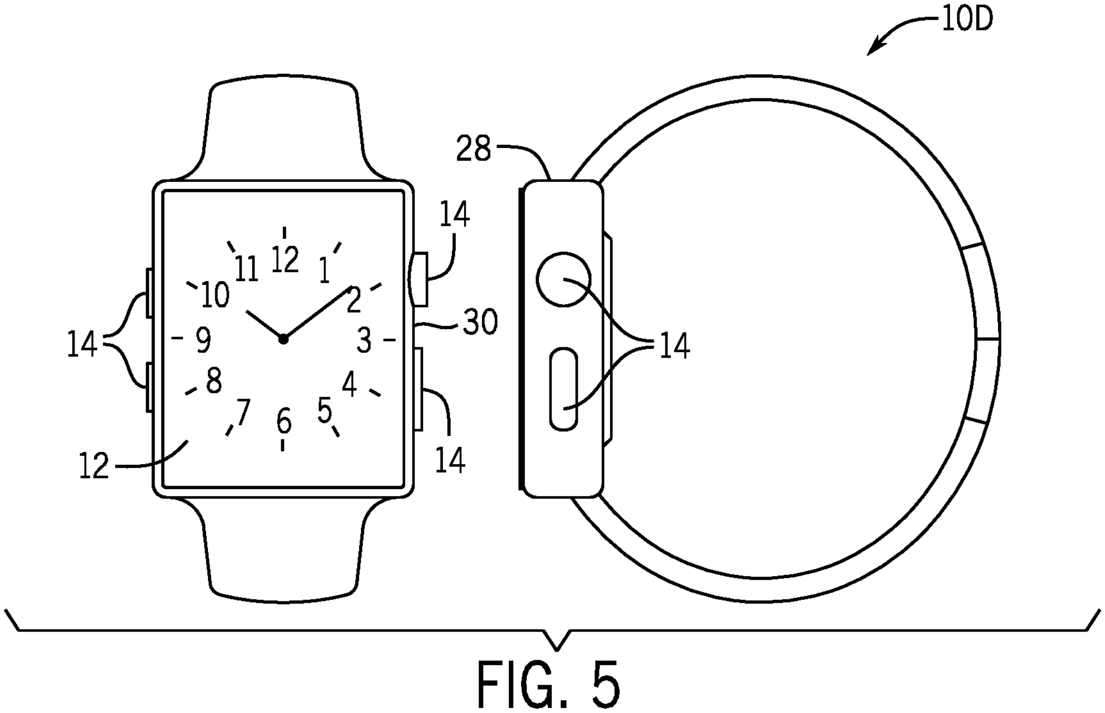
FIG. 5 are front and side views of a watch representing an example of the electronic device of FIG. 1, in accordance with an embodiment.

Another example of a suitable electronic device 10, specifically, a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Referring back to FIG. 1, circuitry of the electronic device 10, such as those illustrated in FIG. 1, may be fabricated on one or more substrates and may employ different power source 26 voltage levels. The PMU 28 may control and/or monitor signals delivering the electrical power from the power source 26, which may be done based on one or more voltage regulator circuits that generate regulated voltage levels to be delivered to the various circuitries of the electronic device 10. For example, the PMU 28 may adjust the electrical power delivered to one or more domains, such as an analog domain, a digital domain, or the like. The PMU 28 may adjust the voltage levels based on operational modes instructed by the processor core complex 18 and/or based on expected or desired energy consumption levels of one or more different components or systems of the electronic device 10. Such voltage regulator circuits may employ both passive circuit elements (e.g., inductors, capacitors) as well as active circuit elements (e.g., transistors, diodes). Different types of voltage regulator circuits may be employed based on power use of load circuits, available circuit area, and the like.

Keeping the foregoing in mind, during operation of the electronic device 10, the electronic device 10 may have circuitry (e.g., sub-systems) that uses different amounts of power over time. One example of this circuitry may be a system-on-chip (SOC) as is shown in FIG. 6.

Figure 6:
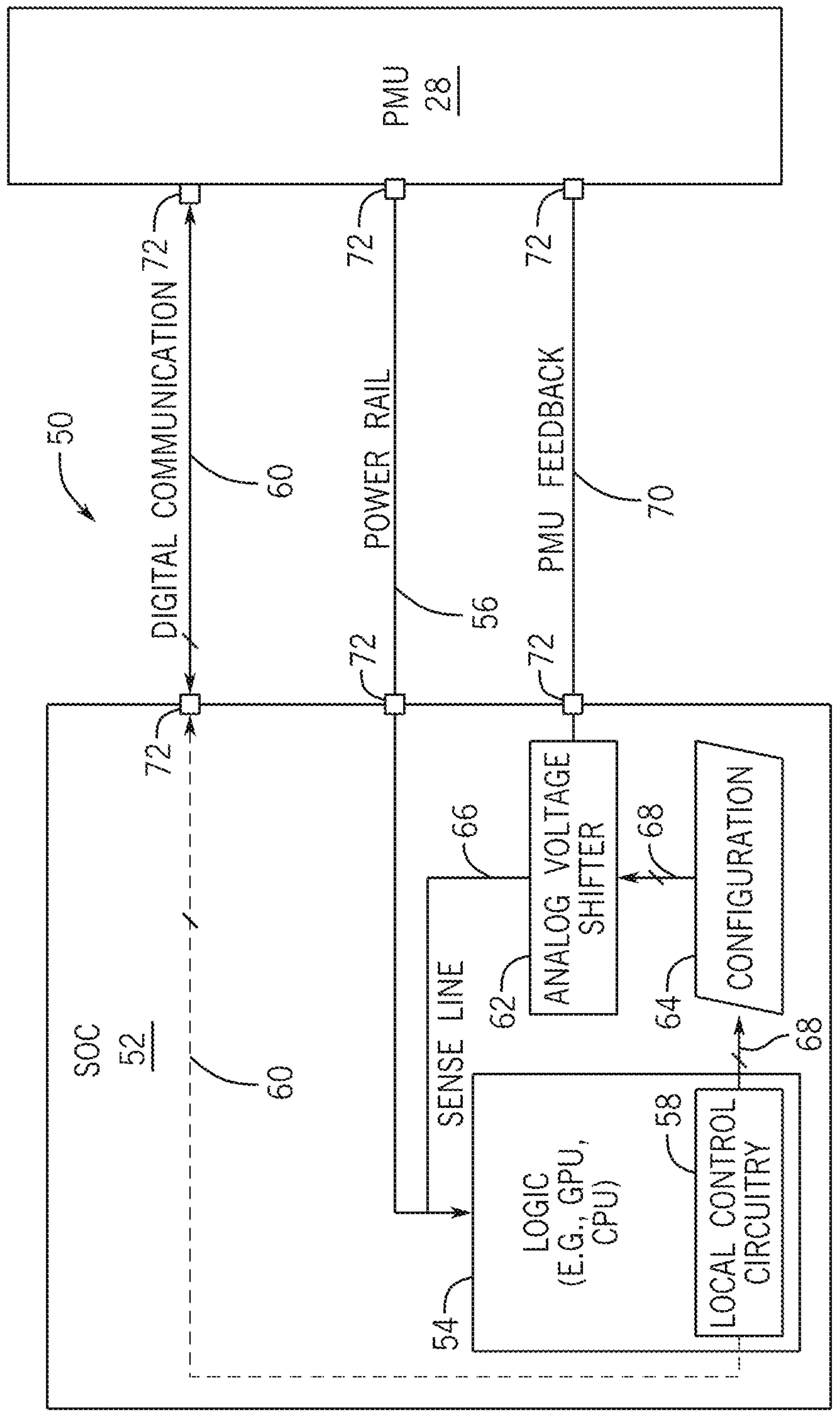
FIG. 6 is a block diagram of a system-on-chip (SOC) and a power management unit (PMU) of the electronic device of FIG. 1, where the SOC includes an analog voltage shifter, in accordance with an embodiment.

To elaborate, FIG. 6 is a block diagram of an example system 50 that includes a system-on-chip (SOC) 52 and the PMU 28. The system 50 may correspond to one or more of the components of the electronic device 10 of FIG. 1. It should be understood that additional or alternative circuitries may be included in the SOC 52 described herein. It should also be understood that the PMU 28 may include any number of regulators or power management circuitry to perform these operations. In some systems, more than one PMU 28 may be included that couple via one or more power rails 56 (and one or more analog voltage shifters 62 as will be described herein) to one or more SOCs 52 or more logic circuitries 54 disposed on one or more dies.

The SOC 52 may perform one or more computing operations via logic circuitry 54 based on power received from the PMU 28 on a power rail 56. The power rail 56 may be considered a power line. The logic circuitry 54 may include local control circuitry 58. The local control circuitry 58 may correspond to any suitable controller or control system. In some cases, the local control circuitry 58 may be a portion of programmable fabric and/or components of the logic circuitry 54 used to control operations of another portion of programmable fabric and/or components of the logic circuitry 54 at least some time during operation.

Over time, an amount of power consumed by the logic circuitry 54 may change, such as when operations performed change and/or when the local control circuitry 58 operates the logic circuitry 54 in and out of different operational modes, as may be instructed from the processor core complex 18, such as in response to instructions from local control circuitry 58. Power delivered via the power rail 56 may be fine tuned to these changes in power consumed, which may increase power efficiencies of the electronic device 10 by helping reduce excess power from being generated and slowing battery draining.

The SOC 52 and the PMU 28 may be communicatively coupled via one or more input-output pins (I/O pins), an example of which are I/O pins 72. Referring briefly to FIG. 1, the I/O ports 16 may correspond to external communications or, in some cases, may refer to I/O ports 16 between sub-systems of the electronic device 10. For example, the I/O ports 16 of FIG. 1 are illustrated as external communication I/O ports 16 but similar I/O ports 16 or I/O pins for internal communications may be used between the display 12 and the processor core complex 18, the memory 20 and the storage devices 22, the PMUs 28 and the processor core complex 18, or any combination of the depicted components. As shown in FIG. 6, I/O pins 72 enable the SOC 52 to be communicatively coupled to the PMU 28 via a digital communication path 60 and a PMU feedback path 70. It is noted that a particular semiconductor system design may be desired based on its use or its lack of use I/O pins 72, where complexity may generally increase as additional I/O pins 72 are added to a system already designed, in use, or in production.

To fine-tune the power delivered, feedback may be sent from the SOC 52 to the PMU 28. This feedback may include sensed data associated with electrical signals on the SOC 52 by which to regulate to a certain voltage and power. The PMU 28 may change the power generated based on the feedback from the SOC 52.

The feedback may be sent via a digital communication path 60. The digital communication path 60 may be any suitable coupling to enable communications to be exchanged using any suitable protocol, such as serial peripheral interface (SPI), inter-integrated circuit ($I^2C$), proprietary protocols based on SPI or $I^2C$, or the like. The digital communication path 60 may be any suitable width. Fine-tuning based on the feedback sent via the digital communication path 60 may be accurate but slow with unpredictable latencies.

To elaborate, the digital communication path 60 may be shared among other portions of the SOC 52 and may not be dedicated to transmitting just feedback from the local control circuitry 58 to the PMU 28. For example, the SOC 52 may transmit telemetry data to the PMU 28 via the digital communication path 60, where the telemetry data may correspond to one or more temperatures of the SOC 52, the PMU 28, and/or the board, a rail voltage of the power rail 56, an input voltage to the PMU 28, an output voltage from the PMU 28, a current transmitted from the PMU 28, a current received by the PMU 28, or the like. It is noted that the digital communication path 60 may include one or more couplings between the SOC 52 and the PMU 28. The local control circuitry 58 may wait for a previous communication to be transmitted before sending its feedback to the PMU 28, which can take unpredictable amounts of time to complete. Possible delays may be further worsened when the same digital communication path 60 is shared among multiple PMUs 28. Thus, faster and/or more consistent methods for delivering feedback and/or implementing power changes may be desired.

Faster and more consistent methods may be described herein. Indeed, the SOC 52, via local control circuitry 58, may fine-tune the power received via power rail 56 by adjusting voltages on the SOC-side based on an analog voltage shifter 62. A power supplied on the power rail 56 may be adjusted based on instructions generated by the local control circuitry 58, the logic circuitry 54, the SOC 52, or the like regarding actual or expected power demands associated with at least the logic circuitry 54. If the power rail 56 were shared with other circuits, the instructions to adjust the power delivered may be based on the other circuit expected or actual power consumption in addition to that of the logic circuitry 54. The feedback corresponding to the actual or expected power demands may be sent from the SOC 52 to the PMU 28.

For example, the local control circuitry 58 may transmit a configuration 64 to the analog voltage shifter 62. The configuration 64 may include or be one or more control bits. The configuration 64 may be transmitted to the analog voltage shifter 62 via path 68, such as to program a register included in the analog voltage shifter 62 or able to be read by the analog voltage shifter 62. In a system where a set point decision is made via circuitry of the SOC 52, a sense line 66 may already be present, even further reducing complexity with implementation of the analog voltage shifter 62 and SOC-side fine-tuning operations described herein. The analog voltage shifter 62 may determine the voltage delivered via the power rail 56 and compare it to the configuration 64. The analog voltage shifter 62 may apply offset (e.g., SOC-side offset) to the voltage delivered via the power rail 56 to increase or decrease the voltage delivered to the logic circuitry 54 based on the difference. The offset may correspond to a positive voltage or a positive voltage offset. The offset may correspond to a negative voltage or a negative voltage offset. The analog voltage shifter 62 may apply the offset to the power rail 56 directly, such as by adjusting a voltage associated with the sense line 66 to shift a voltage delivered via the power rail 56. The analog voltage shifter 62 may transmit feedback indicative of the offset and/or the configuration to the PMU 28 via a dedicated PMU feedback path 70. The PMU 28 may adjust the power delivered via the power rail 56 based on the feedback from the analog voltage shifter 62 as opposed to doing so based on feedback received via the digital communication path 60 (e.g., bus, rail).

The analog voltage shifter 62 may include a voltage regulator and a voltage sensing device to implement the configuration 64 and/or apply the power adjustment (e.g., offset) to the power rail 56. The PMU 28 may be instructed by the analog voltage shifter 62 to adjust (e.g., shift) a voltage regulation target of its voltage regulator corresponding to the power rail 56. By shifting the voltage regulation target, an output voltage, and thus output power, delivered on the power rail 56 to the logic circuitry 54 may shift. The power rail 56 supplied voltage may be shifted based on the analog voltage shifter 62 transmitting feedback data to the PMU 28 via the feedback path 70 and/or instructions sent to the PMU 28 via the digital communication path 60.

Since the SOC 52 may program the analog voltage shifter 62 via the configuration 64 to fine-tune the power delivered as opposed to instructing the PMU 28 to adjust the power delivered via the digital communication path 60, less time may be spent fine-tuning the power delivered. By using these systems and methods, power delivery operations may improve by enabling power delivery systems to be more responsive with less latency being introduced to changes made in response to power consumption. Furthermore, by using these systems and methods any delay in applying the change to the supplied voltage via the sense line 66 may be more consistent relative to the potentially variable latencies of instructing the power changes via the digital communication path 60.

Figure 7:
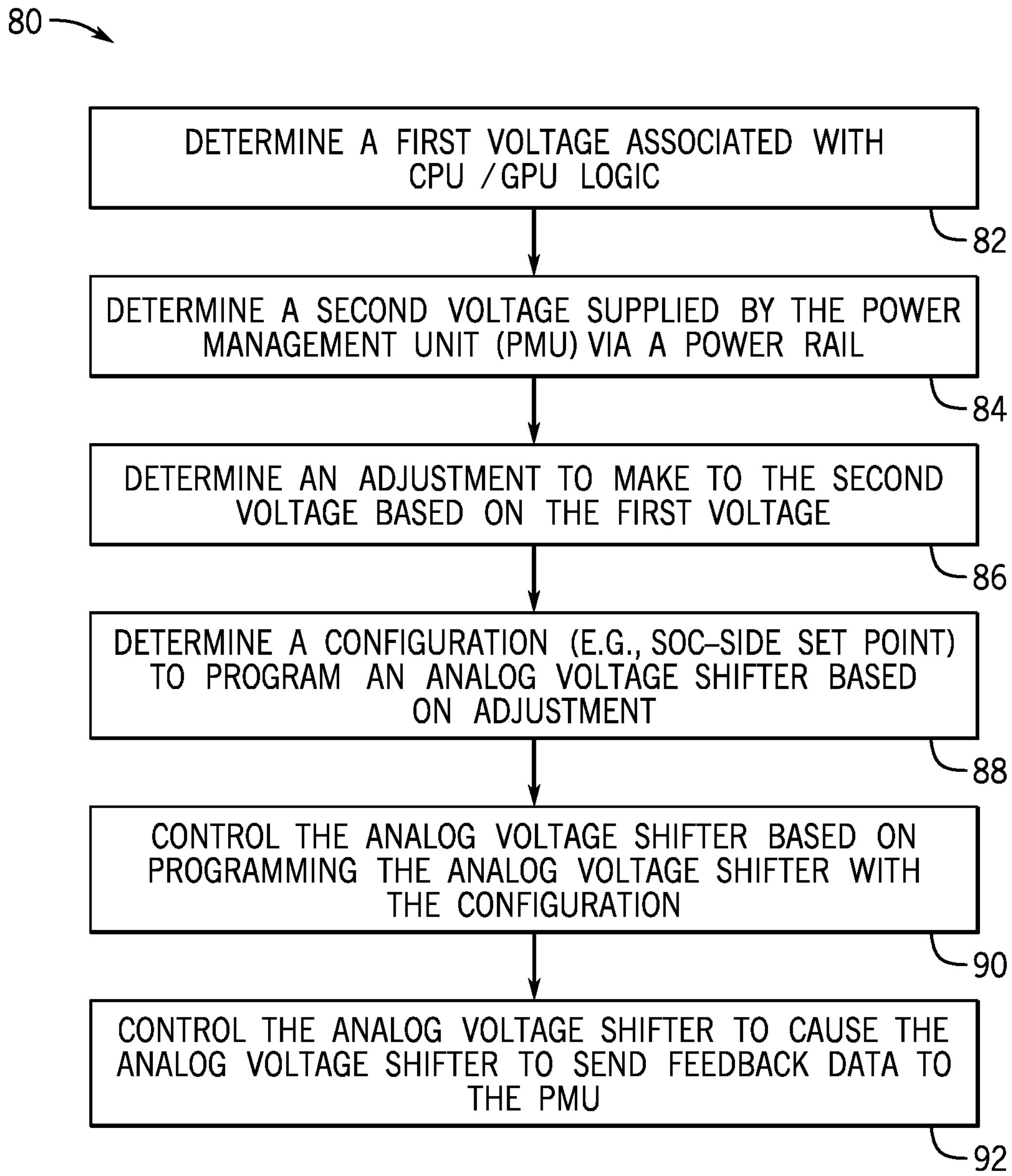
FIG. 7 is a flowchart of a method performed by control circuitry of the SOC of FIG. 6 to adjust a supply voltage of the PMU of FIG. 6 based on the analog voltage shifter of FIG. 6, in accordance with an embodiment.

To elaborate further on analog voltage shifter-based adjustment operations, FIG. 7 is a flowchart of a method 80 performed by the logic circuitry 54, such as via the local control circuitry 58, to adjust power delivered via the power rail 56 by the PMU 28 based on the analog voltage shifter 62. Any suitable device (e.g., a controller) that may control components of the electronic device 10, such as the processor core complex 18, another component of the logic circuitry 54, and/or by the SOC 52, may perform the method 80. In some embodiments, the method 80 may be implemented by executing instructions stored in a tangible, non-transitory, computer-readable medium, such as the memory 20 or storage device 22, using the processor core complex 18 and/or a processor of the local control circuitry 58. For example, the method 80 may be performed at least in part by one or more software components, such as an operating system of the electronic device 10, one or more software applications of the electronic device 10, and the like. While the method 80 is described using steps in a specific sequence, it should be understood that the present disclosure contemplates that the described steps may be performed in different sequences than the sequence illustrated, and certain described steps may be skipped or not performed altogether.

At block 82, the local control circuitry 58 may determine a first voltage used by the first logic circuitry 54. The first voltage may change based on a processing operation being performed by the first logic circuitry 54. The first voltage may increase over time when relatively greater computational demands are being fulfilled by the first logic circuitry 54, and consequently decrease over time as computation demands are reduced. In some cases, the first voltage may change as an operational mode associated with the electronic device 10 is changed, such as a powered on mode, a powered off mode, a normal mode, a reduced computational capability mode, or the like. The first voltage may be an analog voltage signal.

At block 84, the local control circuitry 58 may determine a second voltage supplied by the PMU 28 via the power rail 56. The second voltage may correspond to a PMU-side set point. The second voltage may be an analog voltage signal. The analog voltage shifter 62 may include a voltage sensor coupled in parallel to the power rail 56. The local control circuitry 58 may receive an indication of the second voltage supplied by the PMU 28 on the power rail 56 from the voltage sensor of the analog voltage shifter 62.

At block 86, the local control circuitry 58 may determine an adjustment to make to the second voltage based on the first voltage. The second voltage may have an offset applied to it as the adjustment to increase or decrease a total power delivered to the logic circuitry 54 to equal or substantially equal the first voltage. The first voltage may change based on computational demands of the logic circuitry 54, an operational mode the logic circuitry 54 is operated based on (e.g., low power mode, normal power mode), a temperature or other process variables, or the like. By basing the adjustment on the first voltage, the local control circuitry 58 may determine the adjustment, or the offset to be applied, based on actual system performance as opposed to predictive or expected system performance. In some cases, the local control circuitry 58 may apply similar adjustments to expected power consumptions, which may be determined based on indications from the logic circuitry 54 and/or processor core complex 18 regarding future or scheduled computational loads.

At block 88, the local control circuitry 58 may determine a configuration 64 (e.g., a SOC-side set point) to program the analog voltage shifter 62 to implement the adjustment.

The configuration 64 may include one or more control bits. The configuration 64 may include a set of states for one or more control bits. In some cases, the configuration 64 may be a control word. The configuration 64 may remain static or unchanged over a period of time. In some systems, the configuration 64 may change over time. In some systems, the configuration 64 may include a static or dynamic number of control bits. The configuration 64, once programmed, may be read by the analog voltage shifter 62 and cause the analog voltage shifter 62 to implement the adjustment determined at block 86, thereby enabling control of the analog voltage shifter 62.

At block 90, the local control circuitry 58 may control operation of the analog voltage shifter 62 based on programming the analog voltage shifter 62 with the configuration 64. The configuration 64 may be programmed by the local control circuitry 58 into a register associated with the analog voltage shifter 62. In a system that operates based on the configuration 64 including a dynamic number of control bits, it is noted that the analog voltage shifter 62 may include one or more components able to be programmed based on the dynamic number of control bits, such as a number of control bits that changes between operations and/or over time. The analog voltage shifter 62 may implement the adjustment determined at block 86 based on the configuration 64. the adjustment determined may correspond to the analog voltage shifter 62 applying an offset to increase or decrease the power supplied via the power rail 56, which may enable fine-tuning the power supplied to the power consumption of the logic circuitry 54. Indeed, the analog voltage shifter 62 may apply the configuration, which may adjust one or more passive components and/or one or more active components of the analog voltage shifter 62 the offset to the power rail 56 directly, such as by adjusting a voltage associated with the sense line 66 to shift a voltage delivered via the power rail 56. The one or more passive components and/or one or more active components may include one or more switches, one or more transistors, one or more resistors, one or more capacitors, one or more inductors, or one or more other components, or any combination thereof. Thus, the analog voltage shifter 62 may generate a third voltage to be applied to a second voltage from the PMU 28 to cause a first voltage sent to the logic circuitry 54 to be adjusted to match a power consumed and/or voltage used by the logic circuitry 54.

At block 92, after the adjustment is implemented, the local control circuitry 58 may control the analog voltage shifter 62 and cause it to send feedback data to the PMU 28. The feedback data may indicate the first voltage and/or the adjustment applied to the power rail 56. The PMU 28 may implement the adjustment and/or change a PMU-side set point to equal or substantially equal (e.g., within a threshold deviation) from the first voltage, enabling the adjustment to be implemented with latency such that the analog voltage shifter 62 may stop providing the adjustment at some point later after the PMU 28 has implemented the change.

Figure 8:
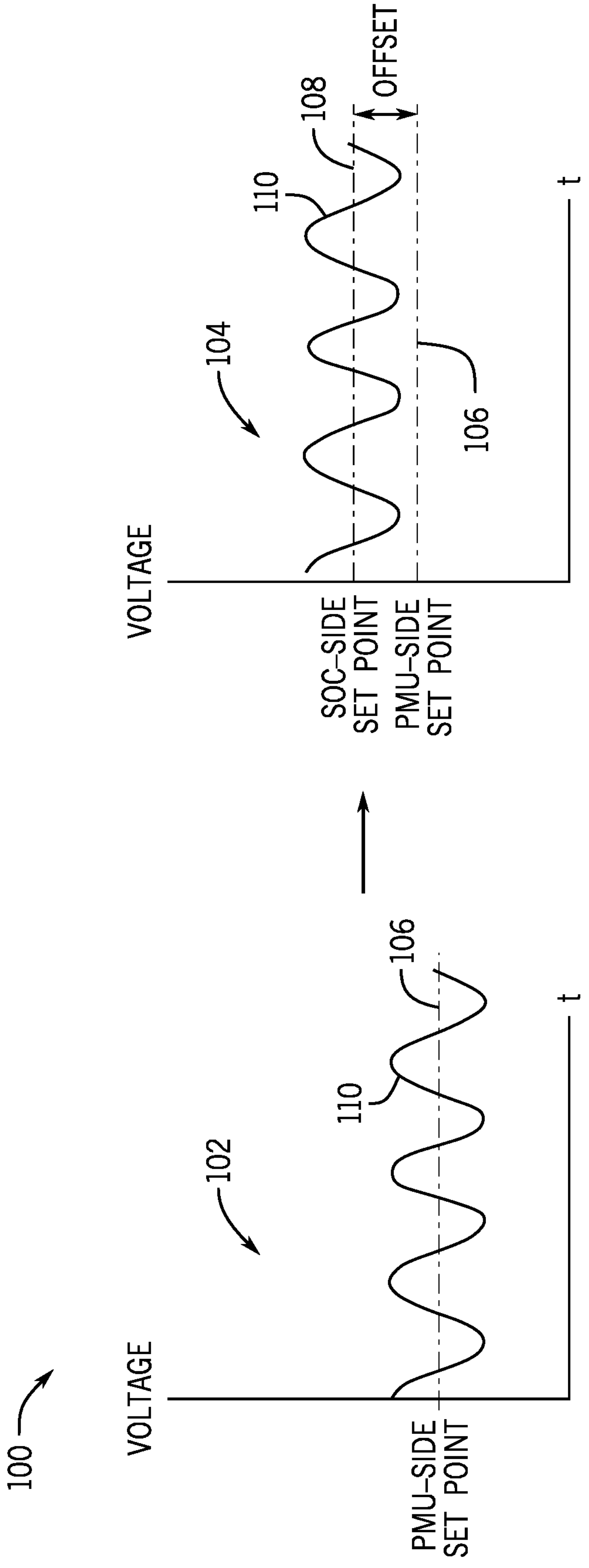
FIG. 8 is a diagrammatic representation of a first plot illustrating a simulated output of the PMU of FIG. 6 at a PMU-side set point and of a second plot illustrating an SOC-side offset having been applied to the simulated output of the PMU of FIG. 6, in accordance with an embodiment.

To elaborate further on SOC-side set points and PMU-side set points, FIG. 8 is a diagrammatic representation 100 of a first plot 102 illustrating a simulated output 110 of the PMU 28 averaging at a PMU-side set point 106 and of a second plot 104 illustrating an SOC-side set point 108 having been applied to the simulated output 110 of the PMU of FIG. 6. At a first time, the PMU 28 may regulate a voltage to the PMU-side set point 106. If at block 86, the SOC 52, via the local control circuitry 58, determines that the first power is different from the second power and that an adjustment should be performed, the SOC 52 may applies its own SOC-side set point 108. As described above in FIGS. 6 and 7, the SOC-side set point 108 may be implemented via the analog voltage shifter 62 based on a configuration programmed by the SOC 52, via the local control circuitry 58, at blocks 88-92. The SOC-side set point 108 may increase a voltage supplied via the power rail 56, thereby increasing an amount of power delivered to the logic circuitry 54, by applying a positive offset to the PMU-side set point 106. Although an increase in voltage (e.g., simulated output 110) is illustrated in FIG. 8, it should be understood that the SOC-side set point 108 may decrease a voltage supplied via the power rail 56, thereby reducing an amount of power delivered to the logic circuitry, by applying a negative offset to the PMU-side set point 106.

Figure 9:
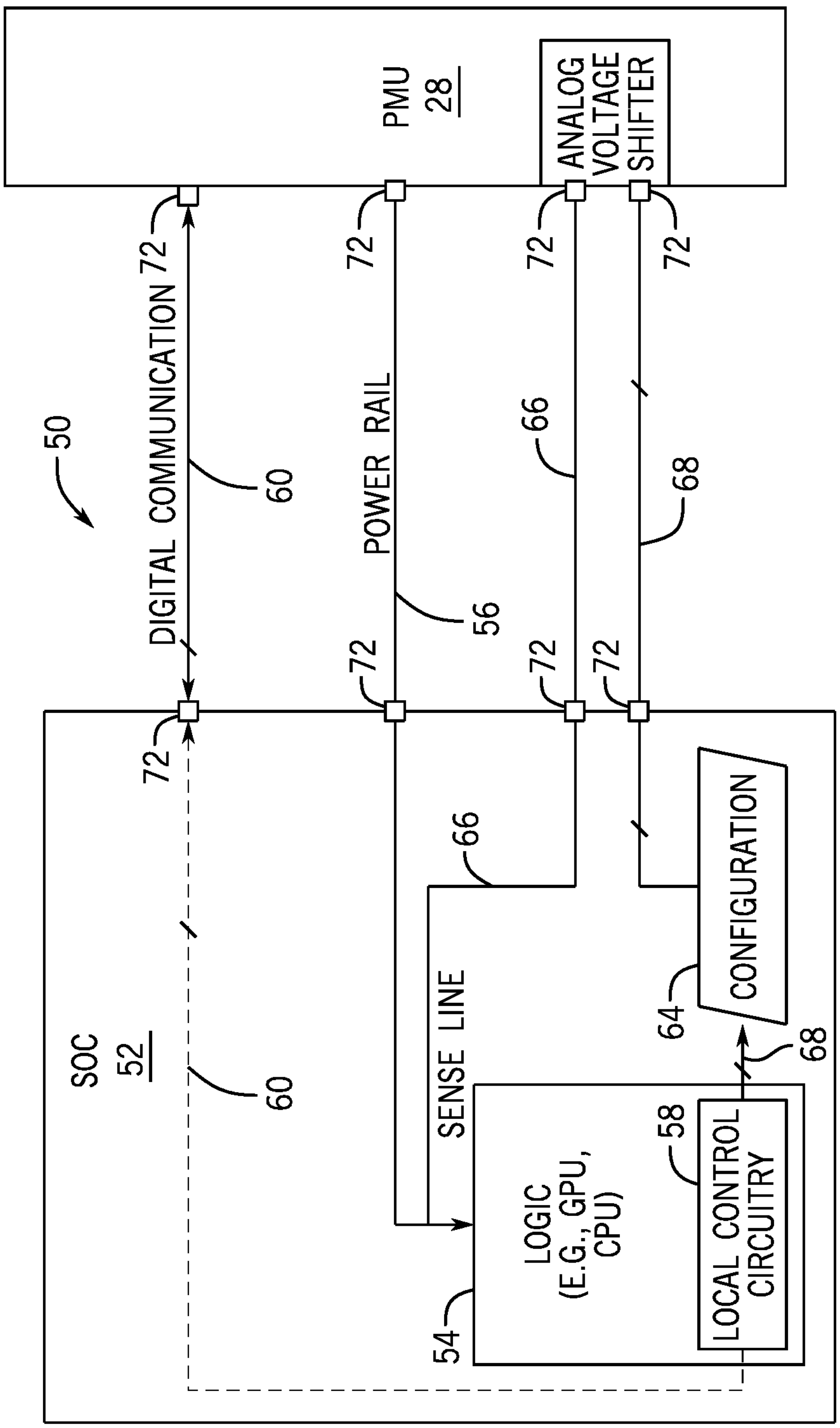
FIG. 9 is a block diagram of a second SOC and a second PMU, where the second PMU includes the analog voltage shifter of FIG. 6 such that the analog voltage shifter is disposed outside of the second SOC and receives control bits from the SOC of FIG. 9, in accordance with an embodiment.

Keeping the foregoing in mind, in some systems, the analog voltage shifter 62 may be disposed outside the SOC 52, such as inside the PMU 28. To elaborate, FIG. 9 is a block diagram of a second SOC 52 and a second PMU 28, where the second PMU 28 includes the analog voltage shifter 62 of FIG. 6. The analog voltage shifter 62 may be disposed outside of the second SOC 52 (e.g., outside of a SOC die) and may receive the configuration 64 (e.g., control bits) from the second SOC 52. This system may use a pair of dedicated I/O ports on the path 68 coupling between the second SOC 52 and the second PMU 28. A size of data transmitted via the path 68 may be based on a number of couplings that make up the path 68. The increase a granularity of voltage adjustment applied by the analog voltage shifter 62, a larger amount of data may be used, where a smallest instruction may be a low-complexity 0 or 1 to indicate no change or decrease, no change or increase, or decrease and increase, or a combination thereof. The larger the number of bits transmitted as the configuration 64 via I/O ports of the path 68, the more detailed the instruction to increase or decrease may be sent. For example, the local control circuitry 58 may send a multi-bit sequence as the configuration 64 to instruct an increase or decrease of a particular value (e.g., increase by 5 volts (V), increase by 10 millivolts (mV), decrease by 1 mV, decrease by 2V, or any suitable value or range). Increasing a number of couplings that use an I/O port that extends beyond a physical boundary of an integrated circuit may increase costs of manufacturing, which may correspond to a less desirable implementation than a SOC-side solution (e.g., described herein such as in FIGS. 6-8) that does not increase the number of couplings as the solution is internal to the SOC 52 and thus may not be limited in physical constraints (e.g., the inability to add an unlimited number of I/O ports) like the PMU-side solution of FIG. 9.

In yet another example, a dedicated communication path may couple the SOC 52 to the PMU 28. However, this may use a dedicated I/O port, similar to that depicted in FIG. 9 of path 68 and thus similarly may increase costs of manufacturing and be less desirable in implementation than a SOC-side solution (e.g., described herein such as in FIGS. 6-8).

The above method implements the adjustment based on the local control circuitry 58 determining the adjustment and implementing the adjustment via a configuration being applied to the analog voltage shifter 62. In some cases, the local control circuitry 58 may transmit an indication of the first voltage to the analog voltage shifter 62 (e.g., as the configuration 64) and the analog voltage shifter 62 may itself determine the second voltage via the sense line 66 and the adjustment to be applied to the second voltage. Thus, which circuitry performs the operations of blocks 84, 86, 88, and 90 may change based on whether the analog voltage shifter 62 is determining the adjustment to be applied and/or whether the local control circuitry 58 is determining the adjustment to be applied.

Furthermore, the above method refers to voltage adjustment operations. In some systems, current adjustment operations may occur instead of or in combination with the voltage adjustment operations to fine tune the power delivered to the SOC 52. Analog voltages are discussed herein. However, it should be understood that similar systems and methods could be applied to digital voltage signals. It should be further understood that any suitable adjustment may be used herein and may be determined based on device type, logic circuitry 54 type and/or application, PMU 28 specifications, other sub-system computational demands and whether more demand should throttle power delivered to the logic circuitry 54, or the like.

In some systems, local control circuitry 58 may control operations of the analog voltage shifter 62 based on operations of the logic circuitry 54. The local control circuitry 58 may, in these cases, perform the method of FIG. 7.

In some embodiments, one or more of PMU 28 may be implemented on a single semiconductor integrated circuit (IC) (e.g., die or chip) and/or may couple to one or more SOC 52 implemented on the same semiconductor IC. In some embodiments, one or more of PMU 28 may be implemented on more than a single semiconductor IC. In some embodiments, one or more of SOC 52 may be implemented on more than a single semiconductor IC. For example, a PMU 28 may be implemented as a chiplet on or adjacent to a semiconductor IC comprising another PMU 28. In some embodiments, one or more of PMU 28 and/or one or more of the SOC 52 are implemented in a chip package as a multi-die module, where one or more distinct die in the multi-die module are communicatively and/or electrically coupled to each other. For example, one or more PMUs 28 may be packaged laterally adjacent to each other and/or one or more SOCs 52 on a surface of an interposer allowing for die to die connections between respective PMUs of the one or more PMUs 28 and/or respective SOCs 52 of the one or more SOCs 52. In some embodiments, one or more of PMU 28 are implemented in a chip package or multi-die module, with a processing IC (e.g., system-on-chip). In some embodiments, one or more passive devices may be packaged with one or more PMU 28. For example, an inductor and/or capacitor may be implemented as chiplets on or adjacent to one or more PMUs 28 (e.g., as integrated passive devices mounted on the PMU 28). In systems with one or more PMUs 28 and one or more SOCs 52, a respective power rail 56 coupling between a respective PMU 28 of the one or more PMUs 28 and respective logic circuitry 54 of a respective SOC 52 of the one or more SOCs 52 may electrically couple to a respective analog voltage shifter 62 configurable by local control circuitry 58 to shift a voltage of that power rail 56 based on an actual power consumption of that respective logic circuitry 54. In this way, that respective analog voltage shifter 62 may also correspond to a respective sensing circuitry and sense line 66 to sense a voltage and/or power supplied by the PMU 28 via that power rail 56 and/or to apply an offset generated based on the actual power consumption of that respective logic circuitry 54.

As one example of the analog voltage shifter 62 operation, the logic circuitry 54 may be a CPU. The logic circuitry 54 may be supplied 1V via the power rail 56. The CPU may determine that, to improve performance, the PMU 28 should adjust the power rail 56 to 10.5V. The CPU may generate and send an instruction to the PMU 28 via the digital communication path 60 to change a set point from 1V to 10.5V, which may take a first duration of time. Alternatively, the CPU may include the analog voltage shifter 62 in parallel to the power rail 56. This may enable the CPU to change the voltage of the power rail 56 to 10.5V by applying a voltage offset of 9.5V. Since the power rail 56 voltage changed, voltage regulators of the PMU 28 may respond by regulating to that new voltage without the PMU 28 changing the settings on the PMU-side. This alternative operation may take a second duration of time, where the second duration of time is less than the first duration of time, thereby improving operation of the CPU.

Technical effects described herein include systems and methods that enable faster adjustment of voltages on a power rail than methods based on digital communication pathways between a system-on-chip (SOC) and a power management unit (PMU). By including an analog voltage shifter inside a physical boundary of the SOC (e.g., inside housing, inside wall, within barrier, disposed on a same die), additional I/O pins may not be installed despite the SOC using a configuration of any size to instruct the analog voltage shifter. Changes may be implemented at the PMU-side based on communications send via the digital communication pathways and/or a PMU feedback path. However, these changes may occur in parallel or after to the changes being applied at the analog voltage shifter itself since implementing the changes at the analog voltage shifter may be relatively faster than programming the PMU itself to make the changes. The SOC-side adjustments may increase or decrease a power output from the PMU before being received at a load (e.g., logic circuitry) based on an output applied by the analog voltage shifter on the SOC-side.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:

a power management unit (PMU); and an integrated circuit coupled to the PMU via a power rail, wherein the integrated circuit comprises:

a load coupled to the PMU via the power rail; and an analog voltage shifter coupled to the power rail via a sense line and coupled to the PMU via a PMU feedback path, wherein the analog voltage shifter is configured to:

adjust a power supplied to the load from the PMU on the power rail by applying an offset voltage via the sense line; and transmit, via the PMU feedback path, feedback data to the PMU indicating the offset voltage applied by the analog voltage shifter to the power rail.

2. The electronic device of claim 1, wherein the integrated circuit comprises control circuitry configured to generate a configuration based on the load.

3. The electronic device of claim 2, wherein the analog voltage shifter is configured to adjust the power based on applying the offset voltage to a first voltage on the power rail by adjusting a second voltage on the sense line, and wherein the offset voltage is set based on the configuration.

4. The electronic device of claim 2, wherein the control circuitry is configured to:

determine a difference between the power supplied to the load via the power rail and power consumed by the load; and generate the configuration based on the difference.

5. The electronic device of claim 1, wherein the analog voltage shifter comprises a voltage regulator and a voltage sensing device.

6. The electronic device of claim 1, wherein the feedback data is to indicate a voltage being regulated by the analog voltage shifter.

7. The electronic device of claim 1, wherein the feedback data is to indicate a configuration applied by the load to the analog voltage shifter.

8. The electronic device of claim 1, comprising a plurality of additional integrated circuits, each having respective analog voltage shifters coupled to the PMU via respective additional power rails.

9. The electronic device of claim 1, wherein the integrated circuit comprises control circuitry configured to:

determine a first voltage associated with the load;

determine a second voltage associated with the power rail; and configure the analog voltage shifter based on the first voltage and the second voltage, wherein the analog voltage shifter is configured to transmit feedback based on the first voltage to the PMU.

10. A system-on-chip comprising:

first circuitry coupled to a power rail associated with a power management unit (PMU);

an analog voltage shifter configured to couple to the power rail via a sense line and coupled to the PMU via a PMU feedback path; and control circuitry configured to:

receive first sensed data indicative of a first voltage associated with the first circuitry;

receive second sensed data indicative of a second voltage associated with the power rail; and send a configuration to the analog voltage shifter based on a difference between the first sensed data and the second sensed data, wherein the analog voltage shifter is configured to apply an offset voltage to the power rail via the sense line based on the configuration and to transmit, via the PMU feedback path, feedback data to the PMU indicating the offset voltage applied to the power rail.

11. The system-on-chip of claim 10, wherein the analog voltage shifter is configured to instruct the PMU to shift the second voltage based on transmitting the feedback data to the PMU via the PMU feedback path.

12. The system-on-chip of claim 10, wherein the analog voltage shifter comprises a voltage regulator and a voltage sensing device.

13. The system-on-chip of claim 10, wherein the analog voltage shifter is configured to generate a third voltage applied to the second voltage to cause the first voltage to be sent to the first circuitry via the power rail.

14. The system-on-chip of claim 10, wherein the offset voltage comprises a negative voltage.

15. A non-transitory, tangible, computer-readable medium comprising instructions that, when executed by a processor, are configured to cause control circuitry of an integrated circuit to perform operations comprising:

receiving first sensed data indicative of a first voltage associated with first circuitry of the integrated circuit;

receiving second sensed data indicative of a second voltage associated with a power rail configured to couple the first circuitry to a power management unit (PMU), wherein the power rail is configured to couple to an analog voltage shifter of the integrated circuit, wherein the analog voltage shifter is outside the PMU; and sending a configuration to the analog voltage shifter based on a difference between the first sensed data and the second sensed data to adjust the second voltage to correspond to the first voltage, wherein the analog voltage shifter is configured to apply an offset voltage to the power rail via a sense line based on the configuration and to transmit, via a PMU feedback path separate from the sense line, feedback data to the PMU indicating the offset voltage applied to the power rail.

16. The non-transitory, tangible, computer-readable medium of claim 15, wherein the operations comprise transmitting an instruction to the PMU at least partially at an overlapping time as sending the configuration to the analog voltage shifter based on the difference.

17. The non-transitory, tangible, computer-readable medium of claim 16, wherein the instruction is configured to be transmitted via a serial peripheral interface and bypasses the analog voltage shifter.

18. The non-transitory, tangible, computer-readable medium of claim 15, wherein sending the configuration to the analog voltage shifter based on the difference is configured to control power received by the first circuitry without instructing the PMU.

19. The non-transitory, tangible, computer-readable medium of claim 15, wherein the offset voltage comprises a positive voltage.

20. The non-transitory, tangible, computer-readable medium of claim 15, comprising generating the configuration to comprise one or more bits to implement, at the analog voltage shifter, the offset voltage to decrease the second voltage into the first voltage.

* * * * *